US005881452A

United States Patent [19]

Nowell, III et al.

[11] Patent Number: 5,881,452

[45] Date of Patent: Mar. 16, 1999

[54] APPARATUS FOR APPLYING DEFORMABLE METAL FASTENER CLIPS TO CONCRETE REINFORCEMENT STEEL AND THE LIKE

[76] Inventors: Stephen C. Nowell, III, 3621 Manatee Ave. W., Bradenton, Fla. 34205; A. Carter Nowell, 2400 Clarendon Blvd. #915, Arlington, Va. 22201

[21] Appl. No.: 968,829

[22] Filed: Nov. 5, 1997

Related U.S. Application Data

[63] Continuation-in-part of Ser. No. 926,917, Sep. 10, 1997.

[51] Int. Cl.$^{6}$ .............................. B23Q 7/10; B23P 11/00

[52] U.S. Cl. .............................................. 29/816; 29/243.56

[58] Field of Search ................................ 29/897.34, 460, 29/513, 525.05, 816, 243.56; 72/409.02, 409.03, 453.16; 52/685, 686, 688, 665, 719

[56] References Cited

U.S. PATENT DOCUMENTS

| | | | |
|---|---|---|---|
| 1,047,655 | 12/1912 | Koerner . | |
| 2,816,288 | 12/1957 | Heilman et al. | 72/453.16 |
| 2,969,545 | 1/1961 | Allen | 29/243.56 |
| 3,017,905 | 1/1962 | Klein | 72/453.16 |
| 3,044,217 | 7/1962 | Berry . | |
| 3,200,488 | 8/1965 | Johansson | 29/897.34 |
| 3,252,263 | 5/1966 | Korf . | |
| 3,300,930 | 1/1967 | Weise . | |
| 3,331,179 | 7/1967 | Ernst et al. . | |
| 3,537,293 | 11/1970 | Gerlach | 72/453.16 |
| 3,628,230 | 12/1971 | Grise . | |
| 3,810,495 | 5/1974 | Pack | 29/243.56 |
| 4,096,680 | 6/1978 | Ritter et al. | 52/665 |
| 4,110,951 | 9/1978 | Padrum . | |
| 4,158,082 | 6/1979 | Belousofsky | 264/DIG. 57 |
| 4,190,999 | 3/1980 | Hampton . | |
| 4,610,122 | 9/1986 | De Clercq . | |
| 4,890,474 | 1/1990 | Agostini et al. | 29/243.56 |
| 4,993,135 | 2/1991 | Seely et al. | 29/243.56 |
| 5,020,355 | 6/1991 | Payne et al. | 29/243.56 |
| 5,035,040 | 7/1991 | Kerrigan et al. . | |
| 5,123,273 | 6/1992 | Kawabata . | |
| 5,371,991 | 12/1994 | Bechtel et al. . | |
| 5,392,580 | 2/1995 | Baumann . | |
| 5,483,815 | 1/1996 | West . | |

*Primary Examiner*—David P. Bryant

*Attorney, Agent, or Firm*—Jeffrey L. Thompson; Thompson & Thompson, P.A.

[57] ABSTRACT

A hand held applicator tool for applying deformable metal fastener clips to secure together reinforcement steel members used in concrete construction. The concrete reinforcement steel members are used to strengthen concrete structures in a known manner and can be in the form of wire mesh sheets or rebar positioned in a grid pattern. The deformable metal fastener clips are generally U-shaped members that are open on one side before being deformed so that the fastener clips can be easily placed over the reinforcement steel members. The tool comprises a frame, an anvil supported at one end of the frame, a movable blade assembly supported for sliding movement along the frame toward the anvil, and a handle for manipulating and positioning the tool. The movable blade assembly has a generally U-shaped receptacle for holding a fastener clip. The anvil has a pair of machined grooves for guiding the first and second legs of a fastener clip generally toward one another to close the open side of the fastener clip and deform the first and second legs to clamp tightly around the reinforcement members. The steel reinforcement members can thus be secured together in substantially less time than with other conventional methods, and with substantially less cost in both materials and labor. The applicator tool design can also be used for applying deformable fastner rings during the manufacture of automotive seating, upholstery, furniture, bedding, and other applications where hog ring fasteners are conventionally used.

23 Claims, 7 Drawing Sheets

APPARATUS FOR APPLYING DEFORMABLE METAL FASTENER CLIPS TO CONCRETE REINFORCEMENT STEEL AND THE LIKE

RELATED APPLICATIONS

This application is a continuation-in-part of the Applicant's copending U.S. application Ser. No. 08/926,917, filed on Sep. 10, 1997.

BACKGROUND OF THE INVENTION

1. Field of the Invention

The present invention relates generally to fastener devices and concrete construction and, in particular, to applicator tools and fastener devices used to fasten concrete reinforcement steel members together during concrete construction.

2. Description of the Related Art

Deformable metal fasteners called "hog rings" were originally developed in the 18th century to prevent hogs from rooting under fences that confined them. The hog ring device was inserted in a hog's nose and would cause discomfort and irritation if the animal tried to use its snout to dig. The hog ring was later used in a similar fashion on other livestock and also to connect wire fencing in agricultural applications.

In the early 1930s, automobile manufacturers began using hog rings to secure springs and wire in automotive seating. Today, hog rings are still widely used in the automotive industry for this purpose. Hog rings are also employed in the production of low cost upholstered furniture to attach upholstery material to a wire or rod support. Hog rings are similarly used as a fastening device in the bedding industry and in a variety of other industries.

A conventional hog ring fastener consists of a 15-gage wire having a length less than two inches, which is formed into a curved, C-shape with pointed, converging legs. The fastener is deformed when applied by a tool to close and cross the legs and form a loop around a work piece. Known hog ring fasteners are often assembled in strips or sticks and are dispensed in a tool one-at-a-time from a magazine. Conventional C-shaped hog ring fasteners are disclosed, for example, in U.S. Pat. Nos. 5,123,273 and 5,483,815.

Hog ring fasteners are generally designed with a structure or shape that prevents the opposed legs of the fastener from abutting and interfering with one another as the fastener is formed into a loop or ring. Such interference is undesirable because it can prevent the desired forming of the fastener into a loop and can cause jamming or wear and damage to a fastener application tool. The most common way to prevent interference between the legs of a hog ring is to provide the opposed legs with points that are offset or oppositely beveled, as shown, for example, in U.S. Pat. No. 3,628,230. Another known way to prevent interference between the legs of a hog ring is to provide an offset in the legs of the hog ring, as shown, for example, in U.S. Pat. No. 5,035,040.

Precast concrete, such as pipe, drainage structures, and building components (e.g., lintels, wall, floor, and roof panels) are normally reinforced with a latticework of rebar or wire mesh steel in single or multiple layers to enhance the strength of the concrete. The same is true of prestressed concrete, such as building components, bridge beams, and so forth. This is also the method used to reinforce virtually all cast-in-place concrete. For example, concrete highways are typically reinforced with a double mat of No. 5 rebar on six inch centers. When the concrete is being formed using reinforcement steel rebar or wire mesh, the rebar or wire mesh is typically laid out in a grid-like pattern or framework in a concrete form and secured together loosely using wire ties. The reinforcement steel is thus held in place temporarily by the wire ties while concrete is being poured around it. After the concrete sets, the reinforcement steel members are then permanently positioned within the concrete.

Most reinforcement steel members used in commercial concrete construction have been tied together in the same way for many years. The wire ties used to tie the reinforcement steel members together typically comprise very light gage, mild steel wire supplied on a belt-mounted reel. The wire is pulled from the belt-mounted reel, wrapped around the reinforcement steel members, pulled taut with side cutters or pliers, twisted, and cut. This conventional process of tying together reinforcement steel members is very labor intensive and, therefore, adds considerable labor costs to concrete construction jobs.

For example, reinforcement steel can be tied at concrete construction sites by skilled laborers at a rate of approximately 10 seconds per tie and a cost of $18 to $20 per hour using a reel of wire and pliers. Reinforcement steel can also be tied by semi-skilled laborers at a rate of approximately 25 seconds per tie and a cost of $6 to $8 per hour using a conventional loop or swivel process. The net cost of these two processes works out to be about the same.

Manufactured loop ties and hand swivels have also been used to secure reinforcement steel members together during concrete construction. For example, U.S. Pat. No. 3,331,179 discloses a grid of reinforcement steel members secured together, in part, using manufactured spacer rings at the intersection points of the reinforcement steel rods. The manufactured spacer rings are formed with a split 7 (see FIG. 3) for spreading the ring to mount the ring over the reinforcement steel rods. After the spread ring is mounted over the reinforcement steel rods, release of the spread ring results in reclosing of the ring upon the rods due to the elasticity of the material.

Such manufactured spacer rings are expensive to make because they require a relatively large amount of spring steel material for each ring to perform the intended function of spacing the grid away from the bottom surface of the concrete form, and also to provide the elasticity to reclose the ring upon the rods after the ring is spread to mount the ring over the rods. Moreover, such manufactured spacer rings are inefficient to use because they require a rather difficult and tedious process of spreading the rings during installation.

Hog rings and similar fasteners have not been previously used in the construction industry to secure reinforcement steel, such as rebar and welded heavy gage wire mesh, during concrete construction. Conventional hog rings are much too small for this purpose and have not heretofore been recognized as a possible solution to the high labor costs associated with concrete construction.

Moreover, prior art devices used to apply hog rings and similar fasteners in conventional applications have disadvantages that make the devices expensive and inefficient to manufacture and use. For example, U.S. Pat. Nos. 3,628,230, 5,035,040, and 5,123,273 each discloses a hand held, air-powered tool for applying hog rings for use in conventional applications. These prior art tools each utilize a complex mechanical linkage and jaw arrangement for deforming the hog rings, which are fed in one-at-a-time from a magazine. Another prior art applicator tool is disclosed in U.S. Pat. No. 5,483,815, which uses a rather complex and inefficient series of cams and jaws retained together by a neoprene O-ring. The disadvantages associated with each of these applicator tools would become even more apparent if the same designs were used to apply the larger fastener clips according to the present invention.

SUMMARY OF THE INVENTION

It is an object of the present invention to provide a method and apparatus for fastening concrete reinforcement steel during concrete construction that solves the problems associated with the conventional fastening methods described above.

More specifically, it is an object of the present invention to provide a method and apparatus for fastening concrete reinforcement steel during concrete construction that is inexpensive and easy to use, and that substantially reduces the amount of time required to securely fasten reinforcement steel for concrete structures.

It is a further object of the present invention to provide an improved apparatus for applying deformable, U-shaped fastener clips to secure together two or more reinforcement members or the like for use in concrete construction.

It is yet a further object of the present invention to provide an improved apparatus that can be used to apply deformable fastener rings during the manufacture of automotive seating, furniture, uphosltery, bedding, and a variety of other applications where hog ring fasteners are conventionally used.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

The present invention provides an apparatus and method for fastening concrete reinforcement steel members together using deformable metal fastener clips. The concrete reinforcement steel members which are fastened together by the present invention are used to strengthen concrete structures in a known manner and can be in the form of wire mesh sheets or rebar positioned in a grid pattern. The deformable metal fastener clips are generally U-shaped members that are open on one side before being deformed so that the fastening clips can be easily placed over two or more adjacent reinforcement steel members. The metal fastener clips are deformed around the reinforcement steel members to close the open side of the metal fastener clips, thereby securing the reinforcement steel members together in a desired formation. The free ends of each fastener clip preferably overlap each other after the fastener clips are closed around the reinforcement steel members. The reinforcement steel members can be secured together within a concrete form, or they can be secured together offsite and placed in a concrete form before filling the form with concrete. The deformable fastener clips can be used to efficiently secure reinforcement steel members together during concrete construction with a simple squeeze of the fastener clips around the reinforcement steel members. The steel members can thus be secured together in substantially less time than other conventional methods, and with substantially less cost in both materials and labor.

The present invention solves the problems described above by providing a method for fastening concrete reinforcement steel, comprising the steps of providing a generally U-shaped, deformable fastening clip having an open side for receiving reinforcement steel members, positioning at least two reinforcement steel members adjacent to each other, placing the deformable fastening clip over the reinforcement steel members, and deforming the fastening clip to close the open side about the reinforcement steel members to thereby secure the reinforcement steel members together.

The method also preferably comprises the steps of deforming the fastening clip until the ends of the fastening clip overlap each other to ensure that the reinforcement steel members are held securely. After the reinforcement steel members are secured together by the fastening clips, concrete is then formed around the reinforcement steel members and the fastening clips, thereby permanently fixing the position of the reinforcement steel members.

The deformable fastening clip according to one embodiment is formed with at least one leg bent away from a plane containing the body portion of the deformable fastening clip to prevent the ends of the fastening clip from abutting and interfering with each other when the fastening clip is deformed over the reinforcement steel members. The deformable fastening clip according to another embodiment is entirely flat and is deformed by an applicator having offset jaws to prevent the legs of the fastening clip from abutting and interfering with each other as the fastening clip is closed over the reinforcement steel members.

The deformable fastening clip is preferably made from 12 to 14 gage steel having a length greater than approximately four inches.

According to another aspect of the present invention, the objects and advantages of the invention are achieved by an apparatus for reinforcing concrete structures, comprising a plurality of reinforcement steel members, and a plurality of generally U-shaped, deformable fastening clips which are each closed about two or more adjacent reinforcement steel members, the reinforcement steel members being secured together in a grid pattern by the deformable fastening clips.

According to yet another aspect of the present invention, the objects and advantages of the invention are achieved by an apparatus for securing two or more members together using deformable fastener clips, the apparatus comprising: a frame having a handle for positioning the apparatus relative to the members to be secured together; an anvil supported at one end of the frame, the anvil having at least one machined groove for guiding the first and second legs of a fastener clip generally toward one another to close the open side of the fastener clip and deform the first and second legs around the members to be secured together; and a movable blade assembly having a generally U-shaped receptacle for accommodating one of the fastener clips, the U-shaped receptacle having an open side facing the anvil. The blade assembly is movable relative to the anvil to push a fastener clip held in the U-shaped receptacle against the anvil to cause the first and second legs of the fastener clip to be deformed and tightly clamped around the members to be secured together. Various embodiments of the apparatus are disclosed.

BRIEF DESCRIPTION OF THE DRAWINGS

The present invention will become more clearly appreciated as the disclosure of the invention is made with reference to the accompanying drawings. In the drawings:

FIG. 9(*b*) is a cross-sectional view taken along line B—B in FIG. 9(*a*); and FIG. 9(*c*) is a cross-sectional view taken along line C—C in FIG. 8;

FIG. 13(*b*) is a top view of the apparatus taken along line B'—B' in FIG. 13(*a*); FIG. 13(*c*) is a cross-sectional end view of the apparatus taken along the line C'—C' in FIG. 13(*a*); and FIG. 13(*d*) is a cross-sectional end view of the apparatus taken along the line D'—D' in FIG. 13(*a*); FIG. 14(*b*) is a top view of the apparatus taken along line B"—B" in FIG. 14(*a*); FIG. 14(*c*) is a cross-sectional end view of the apparatus taken along the line C"—C" in FIG. 14(*a*); and FIG. 14(*d*) is a plan view taken along the line D"—D" in FIG. 14(*a*) showing the apparatus being used to apply a deformable metal fastener clip to secure together a pair of intersecting reinforcement members.

DETAILED DESCRIPTION OF THE PREFERRED EMBODIMENTS

A deformable fastening clip 10 according to a first embodiment of the present invention will now be explained with reference to FIGS. 1(*a*) to 1(*c*) of the accompanying drawings.

Figure 1A:
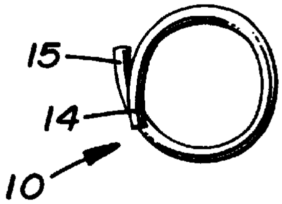
FIGS. 1(*a*) to 1(*c*) illustrate a deformable fastening clip according to a first embodiment of the present invention, wherein FIG. 1(*a*) is a side view of the fastening clip in a closed position, FIG. 1(*b*) is an end view of the fastening clip in an open position, and FIG. 1(*c*) is a side view of the fastening clip in an open position.
Figure 1B:
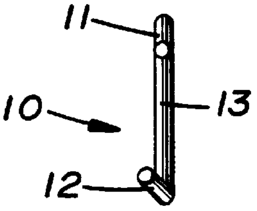
Figure 1C:
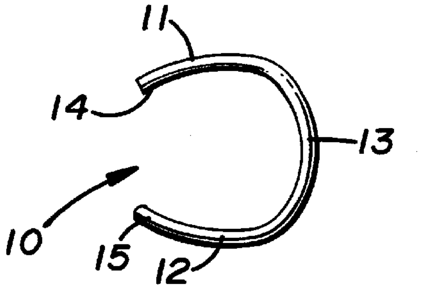

As shown in FIGS. 1(*b*) and 1(*c*), a deformable fastening clip 10 according to the present invention is formed in a generally U-shape with an open side before it is deformed around the reinforcement steel members. The fastening clip 10 has first and second legs 11, 12 and a body portion 13 connecting the first and second legs 11, 12. The first and second legs 11, 12 are curved slightly along their length to facilitate closing the fastening clip 10 over the reinforcement steel members. As shown in FIG. 1(*b*), one of the legs 12 of the fastening clip 10 is bent away from a plane containing the other leg 11 so as to prevent the legs 11, 12 from abutting and interfering with each other when the fastening clip 10 is deformed into a closed position (see FIG. 1(*a*)) over a pair of adjacent reinforcement steel members. In its deformed or closed position, as shown in FIG. 1(*a*), the fastening clip 10 has its ends 14, 15 overlapped to better secure the fastening clip 10 around the reinforcement steel members.

The shape of the deformable fastening clip 10 shown in FIGS. 1(*b*) and 1(*c*) is similar to the shape of a conventional hog ring. However, the deformable fastening clip is constructed of a heavier gage steel wire and a longer length than conventional hog rings so as to be suitable for securing together concrete reinforcement steel members, such as rebar and heavy gage wire mesh. In a preferred embodiment, the fastening clip 10 is constructed of 12 to 14 gage steel wire having a length of approximately 4 to 6 inches. In some applications, such as when extra large steel rebar is used in a concrete construction project, an even heavier gage steel wire or longer length can be used for the fastening clip 10.

Figure 2A:
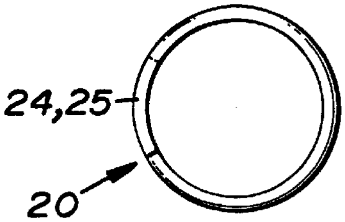
FIGS. 2(*a*) to 2(*c*) illustrate a deformable fastening clip according to a second embodiment of the present invention, wherein FIG. 2(*a*) is a side view of the fastening clip in a closed position, FIG. 2(*b*) is an end view of the fastening clip in an open position, and FIG. 2(*c*) is a side view of the fastening clip in an open position.
Figure 2B:
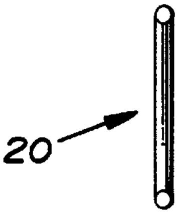
Figure 2C:
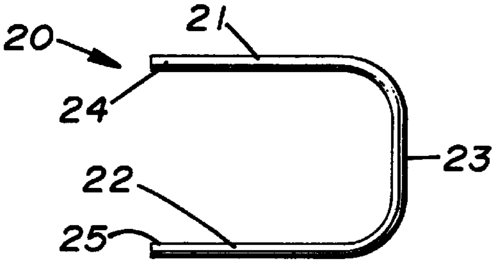

A deformable fastening clip 20 according to a second embodiment of the present invention is shown in FIGS. 2(*a*) to 2(*c*). This deformable fastening clip 20 has first and second legs 21, 22 and a body portion 23 connecting the legs 21, 22. The legs 21, 22 of the fastening clip 20 are generally straight in this embodiment and lie in a common plane with the body portion 23. That is, neither of the legs 21, 22 is bent away from a plane containing the other leg. This reduces the cost of the fastening clip 20 slightly because a simpler manufacturing process can be used if neither of the legs 21, 22 is to be bent. In its deformed or closed position, as shown in FIG. 2(*a*), the fastening clip 20 preferably has its ends 24, 25 overlapped to better secure the fastening clip 20 around the reinforcement steel members.

The deformable fastening clip 20 shown in FIGS. 2(*a*) to 2(*c*) is preferably constructed of similar materials and sizes as the deformable fastening clip 10 shown in FIGS. 1(*a*) to 1(*c*), as described above.

Figure 3:
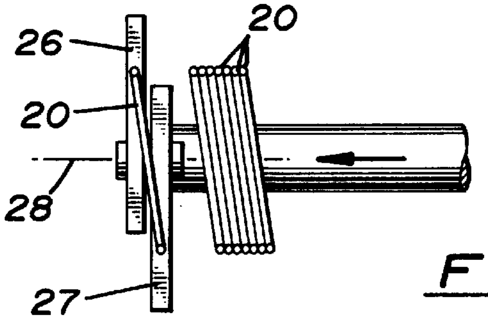
FIG. 3 is a bottom view of a portion of an applicator tool for applying the fastening clips according to the second embodiment of the present invention.

Since the deformable fastening clip 20 shown in FIGS. 2(*a*) to 2(*c*) is completely flat and does not have a bent portion to facilitate overlapping the legs 21, 22 when the fastening clip 20 is closed, a special tool is preferably used to deform the fastening clips 20. A portion of such a tool is shown in FIG. 3. The tool has a pair of jaws 26, 27 that pivot about a common axis 28 and are slightly offset from each other. The fastening clips 20 are fed to the jaws 26, 27 one-at-a-time in a slightly canted manner so that the legs 21, 22 of each fastening clip 20 are engaged by a respective one of the offset jaws 26, 27. Upon pivoting the offset jaws 26, 27 together, the fastening clip 20 held between the jaws 26, 27 is deformed into its closed position with its legs 21, 22 overlapped. The offset jaws 26, 27 of the tool prevent the legs 21, 22 from abutting and interfering with each other when the fastening clip 20 is deformed into its closed position.

Figure 4:
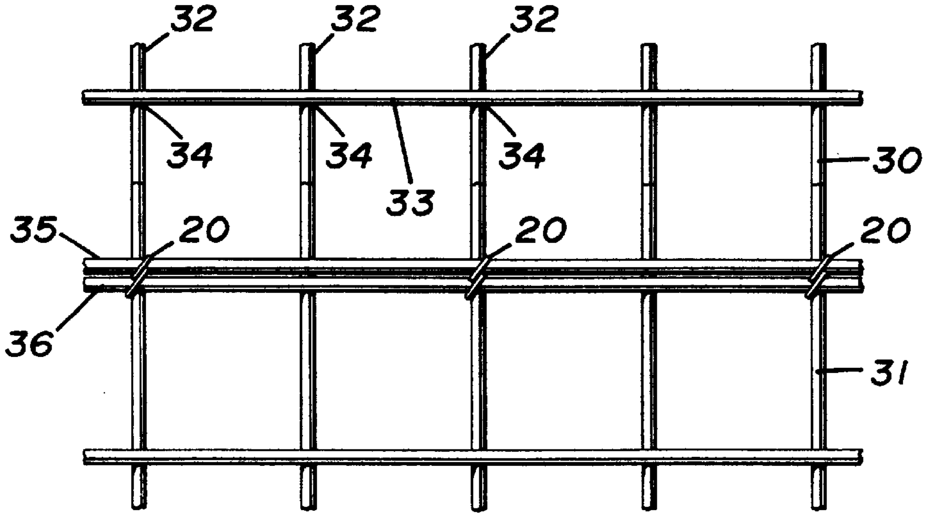
FIG. 4 is a plan view of wire mesh reinforcement steel panels secured together with deformable fastening clips according to the present invention.

FIG. 4 shows a pair of heavy gage steel mesh sheets 30, 31 for use as concrete reinforcement steel, which are secured together using the deformable fastening clips 20 according to the present invention. The steel mesh sheets 30, 31 have a grid pattern of steel members 32, 33 welded together at their intersection points 34 in a known manner. The edges 35, 36 of the steel mesh sheets 30, 31 are abutted and secured together at spaced locations using the deformable fastening clips 20. After being secured together in a desired pattern, the steel mesh sheets 30, 31 can be used to provide reinforcement steel in a precast or cast-in-place concrete structure.

Figure 5:
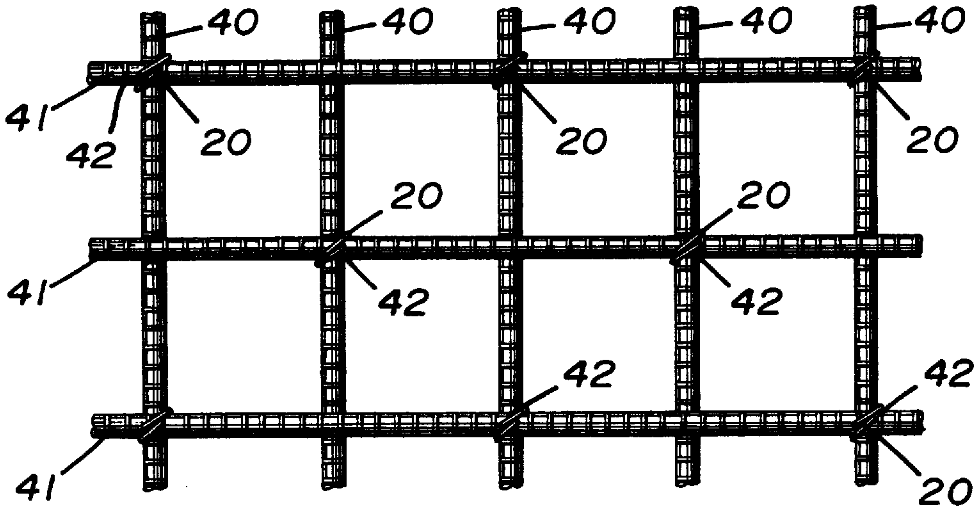
FIG. 5 is a plan view of a grid of reinforcement steel rebar secured together with deformable fastening clips according to the present invention.

FIG. 5 shows a grid pattern of steel rebar members 40, 41 for use as concrete reinforcement steel. The rebar members 40, 41 are secured together at points 42 where the rebar members 40, 41 intersect using the deformable fastening clips 20 according to the present invention. To reduce labor and material costs, the grid of rebar members 40, 41 can be secured together at every-other intersection point 42, as shown in FIG. 5. After being secured together in a desired pattern, the grid pattern of steel rebar members 40, 41 can be used to provide reinforcement steel in a precast or cast-in-place concrete structure.

Figure 6:
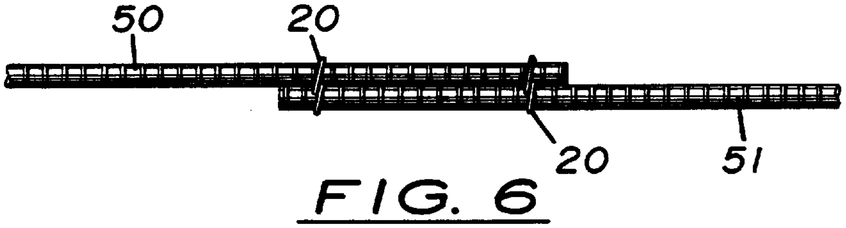
FIG. 6 is a side view showing two reinforcement steel rebar members secured together using the deformable fastening clips according to the present invention.
Figure 7:
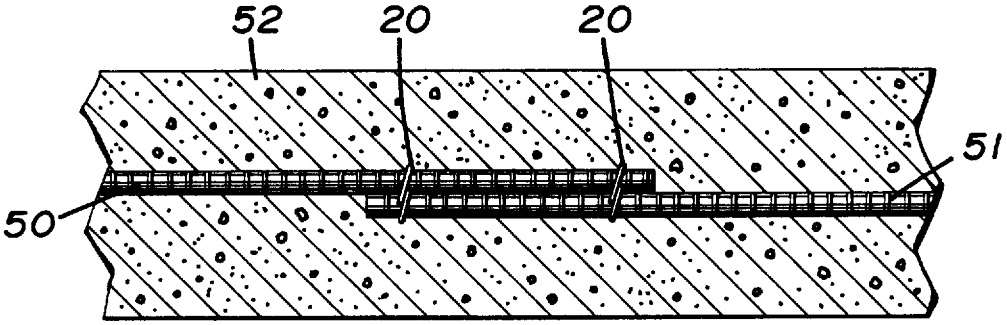
FIG. 7 is a side view similar to FIG. 6 showing two reinforcement steel rebar members secured together within a concrete formation using the deformable fastening clips according to the present invention.

FIG. 6 shows a pair of steel rebar members 50, 51 secured together end-to-end using two deformable fastening clips 20 according to the present invention. FIG. 7 shows the steel rebar members 50, 51 of FIG. 6 embedded in a concrete structure 52, such as a wall or floor.

The deformable fastening clip arrangement according to the present invention provides a positive and secure clamping of rebar or heavy gage wire mesh for use in reinforcing a concrete structure. The positive clamping causes the deformed steel of the fastening clip to interlock with the steel of the rebar or wire mesh and prevent slippage. The deformable fastening clip of the present invention thus results in a stronger assembly of reinforcement steel than the prior art.

The deformable fastening clip arrangement according to the present invention is fast and simple to install with specially designed pliers, a pneumatic gun, or other suitable mechanism.

A novel hand held tool 60 for applying the deformable metal fastener clips 20 will now be described with reference to FIGS. 8 to 12(*b*) of the accompanying drawings. By installing the deformable metal fastener clips 20 using this tool, a labor reduction of approximately 90 percent can be realized over the conventional hand tying methods described above.

Figure 8:
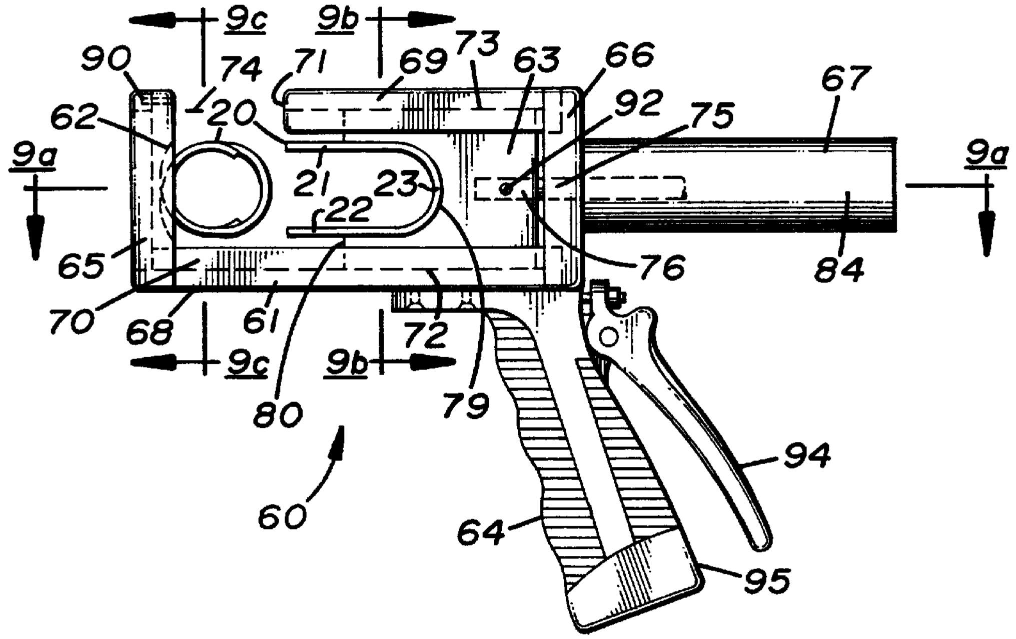
FIG. 8 is a side view of a hand held apparatus for applying deformable metal fastener clips to concrete reinforcement steel according to the present invention.

As shown in FIG. 8, the hand held tool 60 for applying the deformable fastener clips 20 comprises a frame 61, an anvil 62 supported at one end of the frame 61, a movable blade assembly 63 supported for sliding movement along the frame 61, and a handle 64 for manipulating and positioning the tool 60.

The frame 61 is generally rectangular-shaped with a first side 65 supporting the anvil 62, a second side 66 supporting a drive means 67 for moving the blade assembly 63, and third and fourth sides 68, 69 having parallel guiding grooves 70, 71 or the like for guiding opposite edges 72, 73 of the blade assembly 63 as the blade assembly 63 is moved toward and away from the anvil 62. The fourth side 69 of the frame 61 defines an opening 74 for allowing the tool 60 to be positioned over the reinforcement members 40, 41, 50, 51 to be secured together by the fastener clips 20. The first and third sides 65, 68 of the frame 61 together form an L-shaped portion of the frame 61 which supports the anvil 62 in a position facing the movable blade assembly 63. The second side 66 of the frame 61 provides a base portion for supporting the drive means 67. The base portion has an opening 75 through which a connecting rod 76 extends from the drive means 67 to connect with the movable blade assembly 63.

Figure 9A:
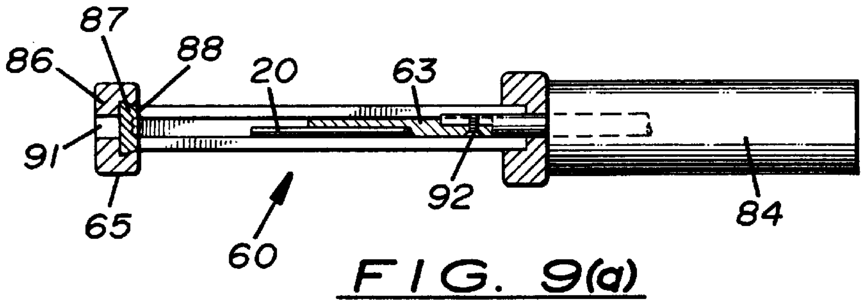
FIGS. 9(*a*) to 9(*c*) are cross-sectional views of the hand held apparatus shown in FIG. 8, wherein FIG. 9(*a*) is a cross-sectional view taken along line A—A in FIG. 8.
Figure 9B:
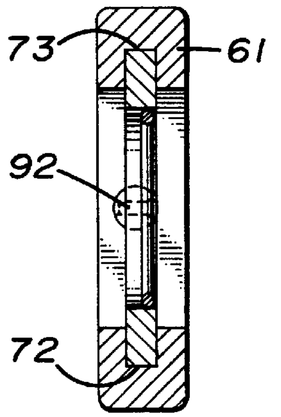
Figure 9C:
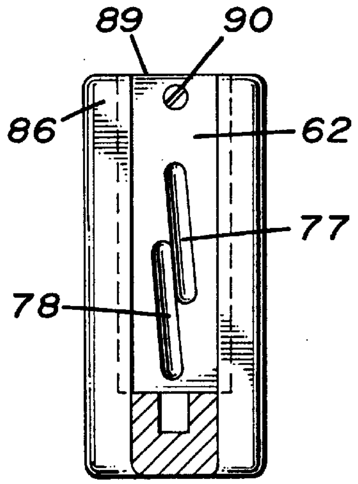

The anvil 62 has at least one, and preferably two machined grooves 77, 78 for guiding the first and second legs 21, 22, respectively, of a fastener clip 20 generally toward one another to close the open side of the fastener clip 20 and deform the first and second legs 21, 22 around the reinforcement members 40, 41, 50, 51 to tightly clamp the reinforcement members together. As shown in FIG. 9(*c*), the two machined grooves 77, 78 are positioned generally side-by-side with each other and are canted relative to a plane of the fastener clip 20 held by the movable blade assembly 63. Thus, the legs 21, 22 of the U-shaped fastener clip 20 can be coplanar with a body portion 23 of the fastener clip 20 without causing the legs 21, 22 to abut and interfere with each other as the fastener clip 20 is deformed by the anvil 62. Since the legs 21, 22 and body portion 23 of the fastener clips 20 are in the same plane, the fastener clips 20 are more efficient and economical to manufacture and use.

The movable blade assembly 63 is formed of a relatively flat plate and has a generally U-shaped receptacle 79 for accommodating one of the fastener clips 20. The U-shaped receptacle 79 has an open side 80 facing the anvil 62. The blade assembly 63 is movable toward the anvil 62 to push a fastener clip 20 held in the U-shaped receptacle 79 against the anvil 62 to cause the first and second legs 21, 22 of the fastener clip 20 to be deformed around the members 40, 41, 50, 51 to be secured together. The movable blade assembly 63 is magnetized to help keep the fastener clips 20 within the U-shaped receptacle 79 until the fastener clips 20 are applied to the reinforcement members 40, 41, 50, 51. An extended portion of the blade assembly 63 provides a retainer for the next fastener clip 20 to be loaded when the blade assembly 63 returns to its retracted position away from the anvil 62.

A spring-actuated magazine 82 (shown diagrammatically in FIG. 11) containing a supply of fastener clips 20 is mounted to the apparatus 60 with a first end of the magazine 82 adjacent the generally U-shaped receptacle 79 of the blade assembly 63. The fastener clips 20 are supplied by the magazine 82 one-at-a-time to the generally U-shaped receptacle 79 in a known manner.

The drive means 67 connected to the movable blade assembly 63 is operable to move the blade assembly 63 linearly toward and away from the anvil 63. The drive means 67 comprises a piston and cylinder arrangement in which a piston is driven within a cylinder 84 by pneumatic pressure supplied by a compressed air source (not shown). Alternatively, the piston can be driven by igniting propane or other suitable gas within the cylinder 84. The fuel source for the latter arrangement can be carried in a small canister on the tool 60 in a known manner, thereby making the tool 60 more portable and easier to handle at a construction site without an attached air hose. A spring (not shown) is preferably used within the piston and cylinder arrangement to return the blade assembly 63 to an at-rest position away from the anvil 62.

The first side 65 of the frame 61 comprises an anvil supporting member 86 having an anvil receiving groove 87 which is open on a side 88 facing the movable blade assembly 63. The anvil receiving groove 87 is also open at a free end 89 of the anvil supporting member 86 for inserting the anvil 62 during assembly. The anvil 62 is received in the anvil receiving groove 87 and secured in place by a threaded screw 90 or other suitable fastener means. The anvil receiving groove 87 has a generally dovetail-shaped cross-section (see FIG. 9(*a*) which prevents removal of the anvil 62 from the anvil receiving groove 87 in a direction toward the movable blade assembly 63, and permits removal of the anvil 62 by sliding the anvil 62 through the open free end of the anvil supporting member 86 when the fastening screw 90 is removed.

The anvil supporting member 86 has a through opening 91 when the anvil 62 is removed. The through opening 91 is large enough to permit the movable blade assembly 63 to pass therethrough for removal of the blade assembly 63 from the frame 61. The anvil 62 and the movable blade assembly 63 are each detachable from the frame 61 upon removal of a single fastening screw 90 securing the anvil 62 to the frame 61 and a single fastening screw 92 securing the blade assembly 63 to the connecting member 76 of the drive means 67. With this arrangement, the blade assembly 63 and anvil 62 can be removed and replaced in approximately one minute to prepare the tool 60 for applying fastener clips 20 having a different size or shape. The magazine 82 would also need to be changed to adapt to the different fastener clips 20.

An actuating lever 94 is positioned adjacent to the back side 95 of the handle 64 for actuation by the palm of an operator's hand. The actuating lever 94 is operable as a firing mechanism to cause the drive means 67 to move the blade assembly 63 toward the anvil 62. As compared to a trigger actuator, the actuating lever 94 on the back side 95 of the handle 64 relieves stress, lowers energy expended, is much easier to use, and provides more positive control than a finger-actuated trigger. The actuating lever 94 also makes the tool 60 cheaper and faster to train unskilled laborers to perform productively.

Figure 10:
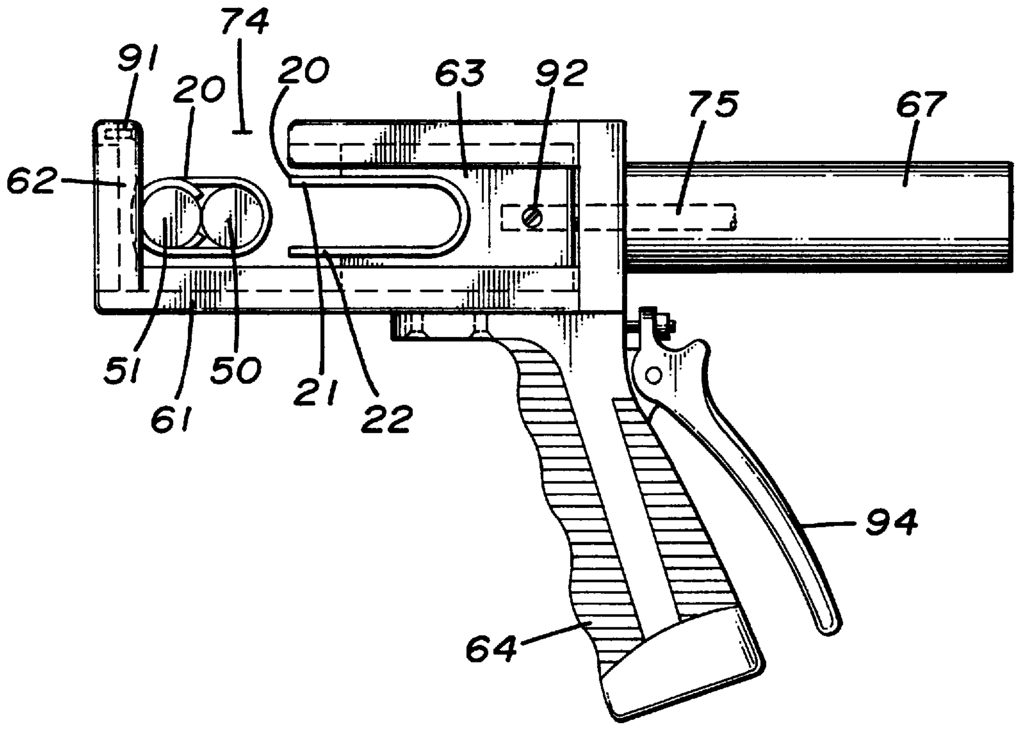
FIG. 10 is a side view of a hand held apparatus, which is similar to the apparatus shown in FIG. 8, for applying deformable metal fastener clips to secure together two reinforcement steel members.
Figure 11:
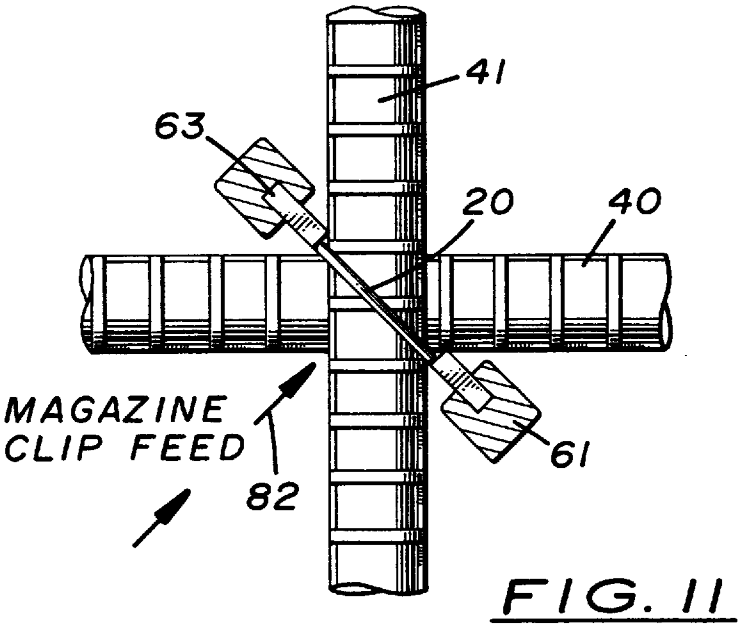
FIG. 11 is a bottom view in partial section of the hand held apparatus being used to apply a deformable metal fastener clip to secure together a pair of intersecting rebar members.

As shown in FIGS. 8 and 10, the handle 64 is preferably ergonomically designed to be used with the wrist straight and stiff, whereby the elbow and forearm do the work. This eliminates any potential for carpal tunnel syndrome and undue fatigue experienced by the operator. The handle 64 is preferably covered by ribbed polypropelene, which is vented for comfort and perspiration relief.

As described above, each of the fastener clips 20 comprises a curved body portion 23 connecting the first and second deformable legs 21, 22. The curved body portion 23 has a radius of curvature which is the same or slightly larger than a radius of the members 40, 41, 50, 51 to be secured together. The first and second deformable legs 21, 22 of each fastener clip 20 each have a length which is much greater than the radius of the curved body portion 23. More specifically, in the arrangement shown in FIG. 8, the first and second deformable legs 21, 22 of each fastener clip 20 each have a length which is approximately two to three times the radius of the curved body portion 23. In the arrangement shown in FIG. 10, the first and second deformable legs 21, 22 of each fastener clip 20 each have a length which is approximately four to six times the radius of the curved body portion 23.

Figure 12A:
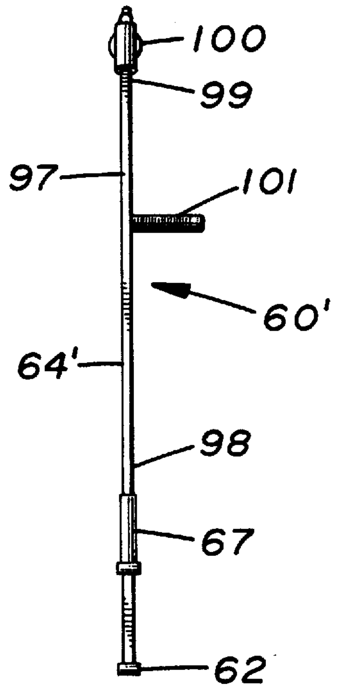
FIGS. 12(*a*) and 12(*b*) are side and edge views, respectively, of a hand held apparatus having an elongated handle member for applying deformable metal fastener clips according to the present invention.
Figure 12B:
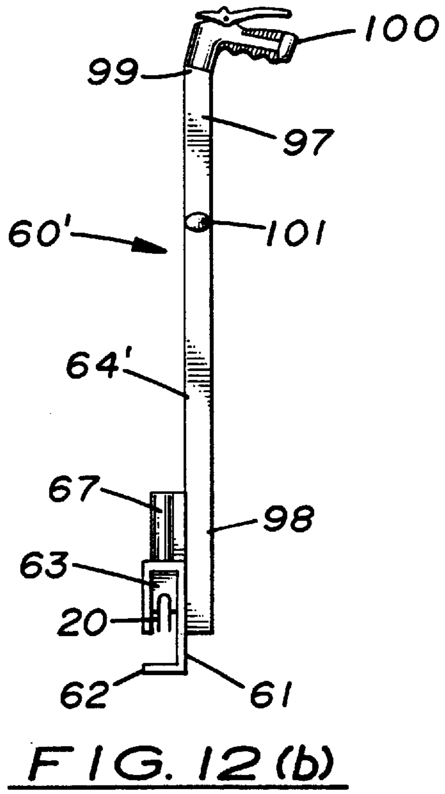
Figure 13A:
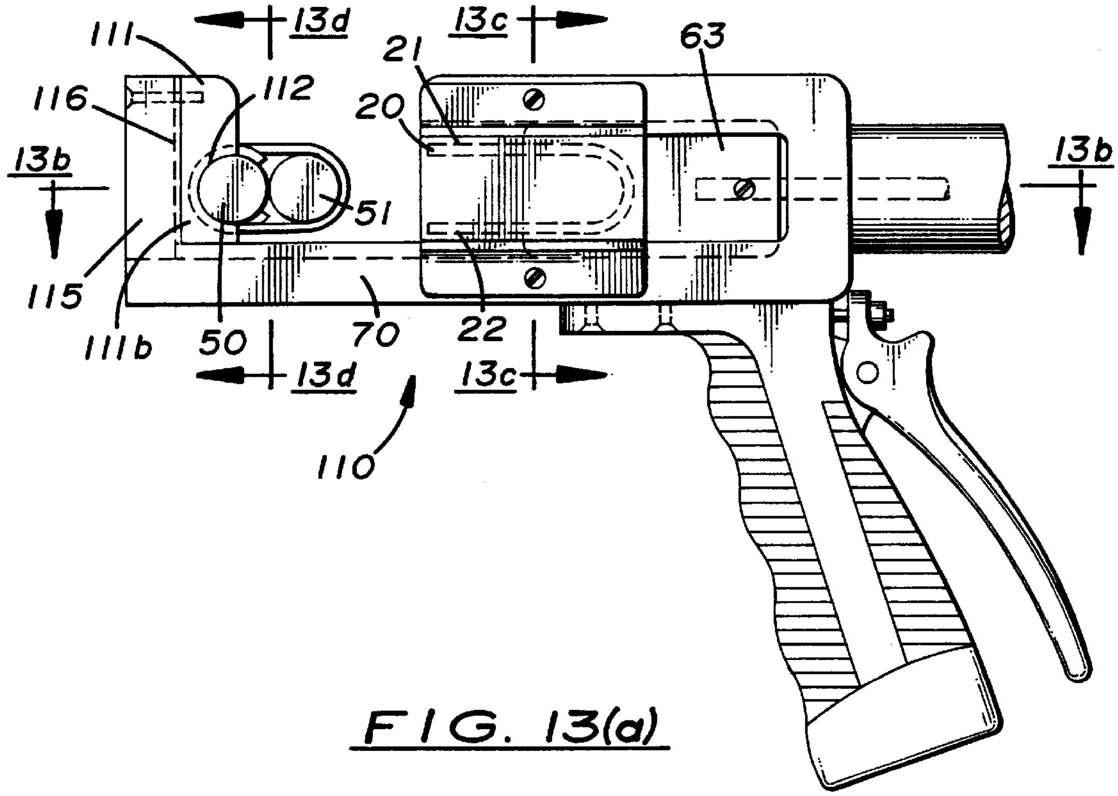
FIGS. 13(*a*) to 13(*d*) show an apparatus for applying deformable metal fastener clips according to another embodiment of the present invention, wherein FIG. 13(*a*) is a side view of the apparatus.
Figure 13B:
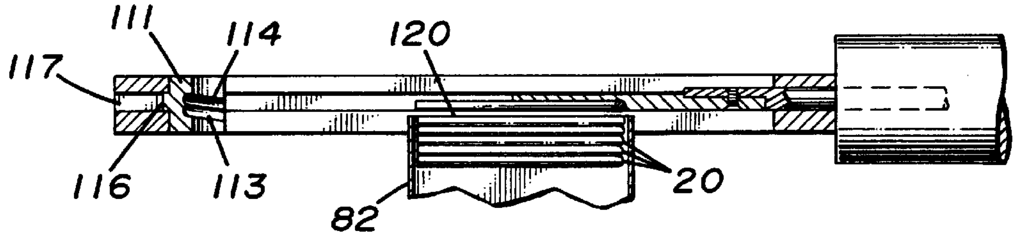
Figure 13C:
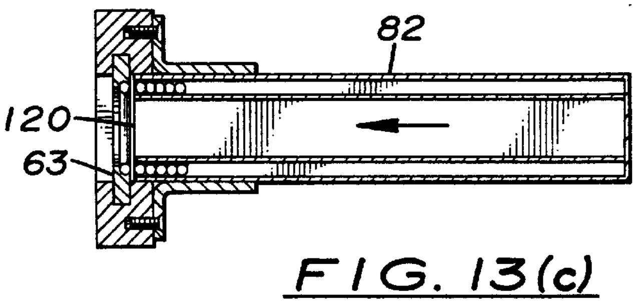
Figure 13D:
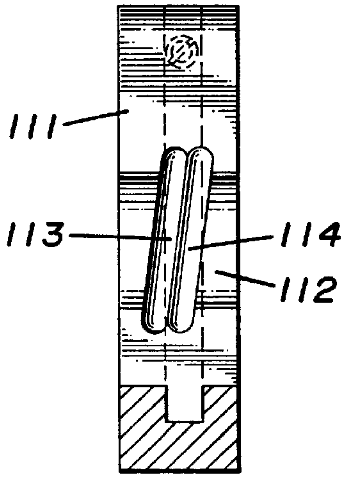
Figure 14A:
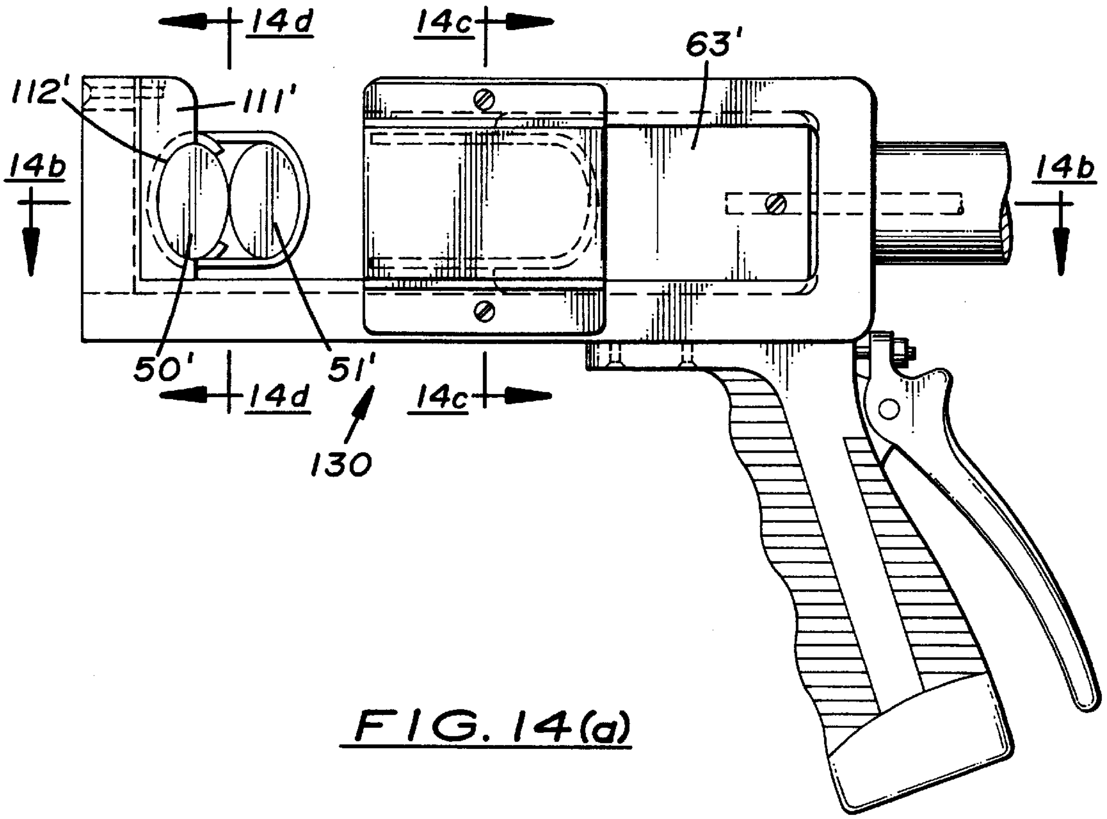
FIGS. 14(*a*) to 14(*d*) show an apparatus for applying deformable metal fastener clips according to yet another embodiment of the present invention, wherein FIG. 14(*a*) is a side view of the apparatus.
Figure 14B:
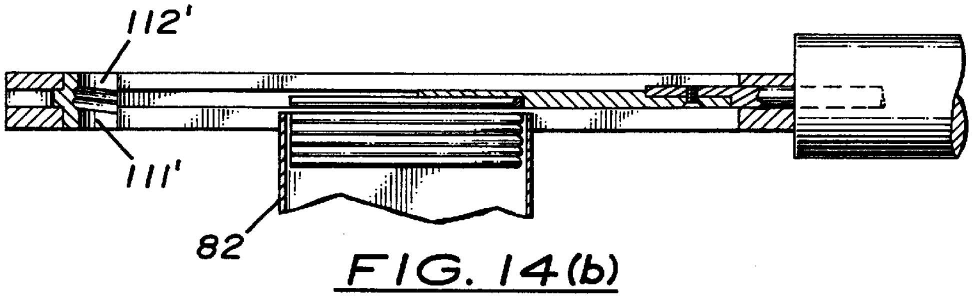
Figure 14C:
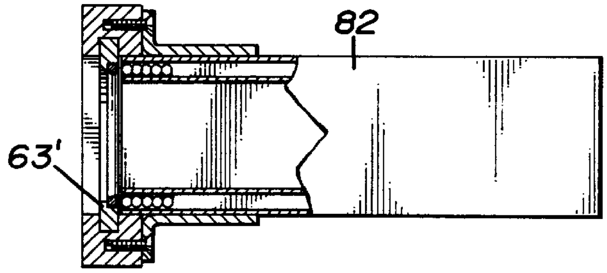
Figure 14D:
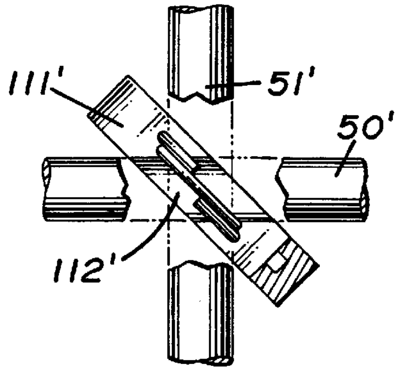

As shown in FIGS. 12(*a*) and 12(*b*), an applicator tool 60' can be provided with an elongated handle 64' (e.g., 36 inches in length) for manipulating and positioning the tool 60 at a construction worksite. The elongated handle 64' comprises an elongated portion 97 having a first end 98 attached to the frame 61 and a second end 99 spaced a distance from the frame 61. The handle 64' includes a hand grip 100 secured to the second end 99 of the elongated portion 97 and a stabilizing grip member 101 secured to the elongated portion 97 between the first and second ends 98, 99 of the elongated portion 97. The tool 60' can be easily manipulated using the hand grip 100 and the stabilizing grip member 101 to minimize stress on the operator's back, neck, and legs.

The two different applicator tools 60, 60' according to the present invention can both be provided at a construction site, one for cross-ties and another for lap-ties. The cross-tie applicator tool 60' would have an elongated handle, as shown in FIGS. 12(*a*) and 12(*b*) for use on floors, highways, and bridge decks, for example. The applicator tool design according to the present invention can also be easily adapted to a robotic manufacturing operation.

As described above, the tools 60, 60' shown in FIGS. 8 to 12(*b*) provide a simple and efficient system for positioning and closing the deformable fastener clips 20 according to the present invention to tightly clamp two or more members 40, 41, 50, 51 together. The tools 60, 60' have very few moving parts, and the force vector from the driving means 67 to the blade assembly 63 is unidirectional. This results in an improvement over prior art tools designed for applying deformable fastener rings because the prior art tools require complex mechanical linkage and/or a series of cams and jaws retained together with one or more resilient O-rings. Unlike the prior art tools, the tool 60, 60' according to the present invention is efficient and inexpensive to manufacture, operate, and maintain.

The applicator tool 60, 60' according to the present invention can also be used to apply deformable fastener rings during the manufacture of automotive seating, upholstery, furniture, and bedding, or any other application, with many of the same advantages described above.

An applicator tool 110 according to another embodiment of the present invention will now be described with reference to FIGS. 13(*a*) to 13(*d*) of the accompanying drawings. The applicator tool 110 has generally the same construction as the applicator tool 60 described above and shown in FIGS. 8 to 9(*c*), except that a different anvil 11 is used with the applicator tool 10 shown in FIGS. 13(*a*) to 13(*d*). A further discussion of the elements common to both embodiments is omitted for brevity.

The anvil 111 has a generally semi-cylindrical recess 112 extending from side-topside for receiving a bottom one 51 of the reinforcement members 50, 51 to be secured together. Two machined grooves 113, 114 are formed in the semi-cylindrical recess 112 for receiving the first and second legs 21, 22, respectively, of a fastener clip 20 held in the blade assembly 63 of the tool 110. The grooves 113, 114 guide the first and second legs 21, 22 of the fastener clip 20 generally toward one another to close the open side of the fastener clip 20 tightly around the reinforcement members 50, 51 to be secured together. The semi-cylindrical recess 112 formed in the anvil 111 facilitates positioning the applicator tool 110 over the reinforcement members 50, 51 so that the blade assembly 63 and the anvil 111 are precisely aligned relative to the reinforcement members before the tool 110 is actuated to close the fastener clips 20 over the reinforcement members.

As shown in FIG. 13(*d*), the two machined grooves 113, 114 in the anvil 111 are formed side-by-side and canted at a slight angle relative to the recess 112. Thus, the two grooves 113, 114 ensure a uniform application of the fastener clips 20 and prevent the legs 21, 22 of the fastener clips 20 from abutting and interfering with each other.

The arrangement for mounting the anvil 111 to the frame 115 of the applicator tool 110 is also different in the embodiment shown in FIGS. 13(*a*) and 13(*b*). The anvil 111 has a machined projection 116 on a side opposite the recess 112 of the anvil 111. The projection 116 is received in a groove or through opening 117 formed in the portion 115 of the frame supporting the anvil 111. The through opening 117 is sized to allow the blade assembly 63 to pass therethrough when the anvil 111 is removed. The projection 116 on the anvil 111 preferably extends over the length of the anvil 111 and along the back edge 111*b* of the anvil for being received in the lower end of the groove 70 that guides the movement of the blade assembly 63 along the frame. A fastening screw 1 18 secures the anvil 111 to the frame 115 and permits the anvil 111 to be removed from the frame 115 easily.

As shown in FIG. 13(*c*), the magazine 82 for holding a supply of fastener clips 20 is connected to an open side of the applicator tool 110. The open end 120 of the magazine 82 is positioned adjacent to the U-shaped receptacle of the movable blade assembly 63 to supply the fastener clips 20 to the blade assembly 63 one-at-a-time.

FIGS. 14(*a*) to 14(*d*) show an applicator tool 130 according to yet another embodiment of the present invention. The applicator tool 130 is similar to the applicator tool 110 shown in FIGS. 13(*a*) to 13(*d*), except that the blade assembly 63' and anvil 111' are sized and shaped differently to receive reinforcement members 50', 51' having a different cross-sectional shape (e.g., oval) and orientation. The anvil 111' has a recess 112', as shown in FIG. 14(*c*), which extends across the anvil 111' at an angle (e.g., 45 degrees) from one side of the anvil 111' to the other side of the anvil 111'. The angled orientation of the recess 112' in the anvil 111' facilitates use of the tool for applying fastener clips 20 to intersecting reinforcement members 50', 51', as shown in FIG. 14(*d*). The construction of the applicator tool 130 permits the blade assembly 63' and anvil 111' to be removed and replaced easily so that the same tool can be used for applying fastener clips 20 to secure together reinforcement members having different sizes and/or shapes.

The fastening clips 10, 20 of the present invention can be formed by shearing the clips from 12 gage stainless steel wire or a suitable high carbon content steel wire. A simple progressive die can be used to form the shape of the fastening clips 10, 20. Tape or adhesive can then be applied to the back of the multiple fastening clips 10, 20 to facilitate loading of the fastening clips into the applicator.

The conventional process of cutting tie wire with pliers to fasten together reinforcement steel members often leaves a razor sharp edge which can become dangerous at a construction site. The fastening clips according to the present invention can be provided with smooth ends, which do not present a hazard at the construction site.

As will be readily apparent from the above description, the use of deformable steel fastening clips and the hand held tool according to the present invention will greatly lower labor cost, expedite construction projects, and vastly improve the structural integrity of concrete structures in all instances where reinforcement steel is used.

It will be appreciated that the present invention is not limited to the exact construction and method that have been described above and illustrated in the accompanying drawings, and that various modifications and changes can be made without departing from the scope and spirit thereof. It is intended that the scope of the invention only be limited by the appended claims.

What is claimed is:

1. An apparatus for securing two or more members together using deformable fastener clips, the fastener clips each comprising a generally U-shaped member having an open side defined by first and second deformable legs, the apparatus comprising:

a frame having a handle for positioning the apparatus relative to the members to be secured together, said frame comprising an anvil supporting member having an anvil receiving groove;

an anvil received in said anvil receiving groove and secured in place by a fastener means, said anvil having at least one machined groove for guiding the first and second legs of a fastener clip to deform around the members to be secured together; and a movable blade assembly having a generally U-shaped receptacle for accommodating one of the fastener clips, said U-shaped receptacle having an open side facing said anvil and said anvil receiving groove, said blade assembly being movable relative to said anvil to push a fastener clip held in said U-shaped receptacle against said anvil to cause the first and second legs of the fastener clip to be deformed around the members to be secured together.

2. The apparatus for securing two or more members together using deformable fastener clips as set forth in claim 1, wherein said anvil comprises two machined grooves for guiding the first and second legs, respectively, of a fastener clip held in said U-shaped receptacle, said two machined grooves being positioned generally side-by-side with each other and being canted relative to a plane of the fastener clip held in said U-shaped receptacle, whereby the legs of the fastener clip can be coplanar with a body portion of the fastener clip without causing the legs to abut and interfere with each other as the fastener clip is deformed by the anvil.

3. The apparatus for securing two or more members together using deformable fastener clips as set forth in claim 1, further comprising a drive means connected to said movable blade assembly for moving said blade assembly linearly toward and away from said anvil.

4. The apparatus for securing two or more members together using deformable fastener clips as set forth in claim 3, further comprising an actuating lever positioned adjacent to said handle, said actuating lever being operable to cause said drive means to move said blade assembly toward said anvil.

5. The apparatus for securing two or more members together using deformable fastener clips as set forth in claim 1, wherein said frame comprises a generally L-shaped portion supporting said anvil, first and second parallel guide portions arranged to guide respective edges of said movable blade assembly as said blade assembly is moved linearly toward and, away from said anvil, and an entrance opening defined between an end of said first guide portion and an end of said generally L-shaped portion of said frame for receiving the members to be secured together between said movable blade assembly and said anvil.

6. The apparatus for securing two or more members together using deformable fastener clips as set forth in claim 5, wherein said frame further comprises a base portion extending between said first and second guide portions, said base portion supporting a piston and cylinder drive assembly having a member connected to said movable blade assembly for moving said blade assembly along said first and second parallel guide portions toward said anvil, and said anvil receiving groove an said anvil being located on a side of said movable blade assembly opposite from said base portion and said piston and cylinder drive assembly.

7. The apparatus for securing two or more members together using deformable fastener clips as set forth in claim 5, wherein said anvil has a recess extending from one side of the anvil to the other side of the anvil for receiving at least a portion of one of the members to be secured together, said recess having a curvature about a longitudinal axis thereof, a radius of said curvature being such that two members to be secured together, each having approximately a same radius as said radius of curvature of said recess, can be passed through said entrance opening simultaneously, said anvil having two grooves formed within said recess for guiding the first and second legs, respectively, of a fastener clip held in said U-shaped receptacle.

8. The apparatus for securing two or more members together using deformable fastener clips as set forth in claim 7, wherein said recess extends across said anvil at an angle from one side of the anvil to the other side of the anvil for receiving a portion of one of two members to be secured together, said angle being such that said longitudinal axis of said recess is not perpendicular to a plane of the fastener clip held in said U-shaped receptacle.

9. The apparatus for securing two or more members together using deformable fastener clips as set forth in claim 7 wherein said longitudinal axis of said recess forms an angle with a plane of the fastener clip held in said U-shaped receptacle of approximately 45 degrees.

10. The apparatus for securing two or more members together using deformable fastener clips as set forth in claim 1, wherein said anvil receiving groove has a generally dovetail-shaped cross-section which prevents removal of said anvil from said anvil receiving groove in a direction toward said movable blade assembly and permits removal of said anvil by sliding said anvil through an open free end of the anvil supporting member.

11. The apparatus for securing two or more members together using deformable fastener clips as set forth in claim 1, wherein said anvil supporting member has a through opening when said anvil is removed, said through opening being large enough to permit said movable blade assembly to pass therethrough for removal of the blade assembly from said frame.

12. The apparatus for securing two or more members together using deformable fastener clips as set forth in claim 1, wherein said movable blade assembly is magnetized to help keep the fastener clips within the U-shaped receptacle until the fastener clips are deformed around the members to be secured together.

13. The apparatus for securing two or more members together using deformable fastener clips as set forth in claim 1, wherein said frame is generally rectangular-shaped with a first side supporting said anvil and said anvil receiving groove, a second side supporting a drive means for moving said blade assembly, and third and fourth sides having guiding means for guiding opposite edges of said blade assembly for linear movement relative to said anvil, said third side defining an opening for allowing the apparatus to be positioned over the members to be secured together, said first and second sides of said frame being connected together by said fourth side of said frame with said first side located on an opposite side of said blade assembly from said second side.

14. The apparatus for securing two or more members together using deformable fastener clips as set forth in claim 1, further comprising a magazine containing a supply of fastener clips, said magazine being mounted to said apparatus with a first end of the magazine adjacent said generally U-shaped receptacle of the blade assembly, whereby the fastener clips are supplied by said magazine to said generally U-shaped receptacle.

15. The apparatus for securing two or more members together using deformable fastener clips as set forth in claim 1, wherein each of said fastener clips comprises a curved body portion connecting said first and second deformable legs, said curved body portion having a radius of curvature which is the same as or slightly larger than a radius of the members to be secured together, said first and second deformable legs of each fastener clip each having a length which is two to six times the radius of said curved body portion of the fastener clip.

16. The apparatus for securing two or more members together using deformable fastener clips as set forth in claim 1, wherein said anvil and said movable blade assembly are each detachable from said frame upon removal of a single fastening screw securing said anvil to said frame and a single fastening screw securing said blade assembly to a connecting member of a drive means for moving the blade assembly.

17. The apparatus for securing two or more members together using deformable fastener clips as set forth in claim 1, wherein said handle comprises an elongated portion having a first end attached to said frame and a second end spaced a distance from said frame, said handle further comprising a hand grip secured to said second end of said elongated portion and a stabilizing grip member secured to said elongated portion and projecting outwardly therefrom between said first and second ends of the elongated portion, whereby said apparatus can be easily manipulated using said hand grip and said stabilizing grip member.

18. A system for reinforcing concrete structures, comprising:

a plurality of reinforcement members to be embedded in concrete;

a plurality of generally U-shaped, deformable fastener clips which are each adapted to be closed about two or more adjacent reinforcement members to secure said reinforcement members together in a pattern, said fastener clips each having an open side defined by first and second deformable legs; and an apparatus for deforming said deformable fastener clips around said adjacent reinforcement members to secure said reinforcement members together, said apparatus comprising:

a frame having a handle for positioning the apparatus relative to said reinforcement members;

an anvil supported at one end of said frame, said anvil having at least one machined groove for guiding said first and second legs of each fastener clip to deform around said reinforcement members;

a movable blade assembly having a generally U-shaped receptacle for accommodating one of said fastener clips at a time, said U-shaped receptacle having an open side facing said anvil, said blade assembly being movable relative to said anvil to push the fastener clip held in said U-shaped receptacle against said anvil to cause the first and second legs of the fastener clip to be deformed around the reinforcement members to secure the reinforcement members together; and a drive means connected to said movable blade assembly for moving said blade assembly linearly toward and away from said anvil;

said frame having an opening adjacent one end of said anvil through which two of said reinforcement members can pass simultaneously and be positioned between said anvil and said movable blade assembly; and said anvil has a recess extending from one side of the anvil to the other side of the anvil for receiving at least a portion of one of said reinforcement members, said recess having curvature about a longitudinal axis with a radius approximately equal to a radius of said reinforcement members.

19. The system for reinforcing concrete structures according to claim 18, wherein both legs of each fastener clip are coplanar with a body portion of the fastener clip, and wherein said anvil comprises two machined grooves for guiding said first and second legs, respectively, of the fastener clip held in said U-shaped receptacle, said two machined grooves being canted relative to a plane of the fastener clip held in said U-shaped receptacle, whereby said anvil is arranged to guide the legs of the fastener clip held in the U-shaped receptacle to prevent the legs from abutting and interfering with each other as the fastener clip is deformed by the anvil.

20. The system for reinforcing concrete structures according to claim 18. wherein said frame is generally rectangular-shaped with a first side supporting said anvil a second side supporting said drive means for moving said blade assembly, and third and fourth sides having guiding means for guiding opposite edges of said blade assembly for linear movement relative to said anvil, one of said third and fourth sides defining said opening for allowing the apparatus to be positioned over the reinforcement members to be secured together.

21. The system for reinforcing concrete structures according to claim 18, wherein each of said fastener clips comprises a curved body portion connecting said first and second deformable legs, said curved body portion having a radius of curvature which is the same as or slightly larger than a radius of the reinforcement members to be secured together, said first and second deformable legs of each fastener clip each having a length which is two to six times the radius of said curved body portion of the fastener clip.

22. The system for reinforcing concrete structures according to claim 18, wherein said longitudinal axis of said recess is approximately coaxial with a longitudinal axis of one of said reinforcement members received in said recess, and said longitudinal axis of said recess extends at a nonperpendicular angle relative to a plane of the U-shaped fastener clip held in the movable receptacle.

23. An apparatus for securing two or more members together using deformable fastener clips, the fastener clips each comprising a generally U-shaped member having an open side defined by first and second deformable legs, the apparatus comprising:

a frame having a handle for positioning the apparatus relative to the members to be secured together;

an anvil supported at one end of said frame, said anvil having at least one machined groove for guiding the first and second legs of a fastener clip to deform around the members to be secured together, said anvil having a recess extending from one side of the anvil to the other side of the anvil for receiving a portion of one of the members to be secured together, said recess having a curvature about a longitudinal axis thereof, a radius of said curvature being such that two members to be secured together, each having approximately a same radius as said radius of curvature of said recess, can be passed through an entrance opening of said frame simultaneously;

a movable blade assembly having a generally U-shaped receptacle for accommodating one of the fastener clips, said U-shaped receptacle having an open side facing said anvil, said blade assembly being movable relative to said anvil to push a fastener clip held in said U-shaped receptacle against said anvil to cause the first and second legs of the fastener clip to be deformed around the members to be secured together; and said longitudinal axis of said recess forms an angle with a plane of the fastener clip held in said U-shaped receptacle of approximately 45 degrees.

* * * * *